United States Patent
Mizusaki et al.

(10) Patent No.: US 8,268,505 B2
(45) Date of Patent: Sep. 18, 2012

(54) FUEL CELL SYSTEM

(75) Inventors: Kimiharu Mizusaki, Utsunomiya (JP); Toshiaki Takeshita, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 346 days.

(21) Appl. No.: 12/011,410

(22) Filed: Jan. 25, 2008

(65) Prior Publication Data

US 2008/0182151 A1 Jul. 31, 2008

(30) Foreign Application Priority Data

Jan. 25, 2007 (JP) .................................. 2007-014839
Nov. 27, 2007 (JP) .................................. 2007-305928

(51) Int. Cl.
*H01M 8/24* (2006.01)
*H01M 2/20* (2006.01)

(52) U.S. Cl. .................. 429/470; 429/452; 429/467

(58) Field of Classification Search ............... 429/1, 12, 429/13, 517, 544, 550, 562, 564; 174/73.1, 174/88 B, DIG. 8; 439/452, 467, 470; *H01M 8/24, H01M 2/20*

See application file for complete search history.

(56) References Cited

U.S. PATENT DOCUMENTS

| 4,383,131 | A | * | 5/1983 | Clabburn | 174/73.1 |
| 5,434,015 | A | * | 7/1995 | Yamada et al. | 429/9 |
| 2004/0062955 | A1 | * | 4/2004 | Kubota et al. | 429/9 |

FOREIGN PATENT DOCUMENTS

| JP | 61-007868 | | 1/1986 |
| JP | 06-290803 | | 10/1994 |
| JP | 2002-100392 | | 4/2002 |
| JP | 2004-71230 | | 3/2004 |
| JP | 2004-071230 | * | 3/2004 |
| JP | 2004-152684 | * | 5/2004 |

OTHER PUBLICATIONS

Chinese Office Action for Application No. 200810008506.1, dated Apr. 3, 2009.

* cited by examiner

*Primary Examiner* — Jennifer Michener
*Assistant Examiner* — Heng Chan
(74) *Attorney, Agent, or Firm* — Nelson Mullins Riley & Scarborough LLP; Anthony A. Laurentano

(57) ABSTRACT

A fuel cell stack includes a stack body formed by stacking a plurality of power generation cells. At opposite ends of the stack body in a stacking direction, end plates are provided. A second power collecting terminal protrudes outwardly from the end plate. One end of a bus bar is electrically connected to the second power collecting terminal such that the bus bar extends along an end plate surface intersecting the second power collecting terminal. A high voltage cable is connected to the other end of the bus bar. The high voltage cable is drawn toward the end plate.

6 Claims, 10 Drawing Sheets

US 8,268,505 B2

FUEL CELL SYSTEM

BACKGROUND OF THE INVENTION

1. Field of the Invention

The present invention relates to a fuel cell system including a fuel cell stack comprising a stack body formed by stacking a plurality of power generation cells in a stacking direction, end plates provided at opposite ends of the stack body in the stacking direction, and power collecting terminals protruding outwardly from the end plates. The power generation cell includes an electrolyte electrode assembly and a separator. The electrolyte electrode assembly includes a pair of electrodes and an electrolyte interposed between the electrodes.

2. Description of the Related Art

For example, a polymer electrolyte fuel cell employs an electrolyte membrane (electrolyte). The electrolyte membrane is a polymer ion exchange membrane. A membrane electrode assembly (electrolyte electrode assembly) includes an anode, a cathode, and the electrolyte membrane interposed between the anode and the cathode. The membrane electrode assembly and separators sandwiching the membrane electrode assembly make up a unit of a fuel cell (power generation cell) for generating electricity. In use of the polymer electrolyte fuel cell, a predetermined number of power generation cells are stacked together to form a fuel cell stack.

In the fuel cell stack, normally, terminal plates, insulating plates, and end plates are provided at opposite ends of a stack body formed by stacking a plurality of power generation cells in the stacking direction. The terminal plates have power collecting terminals for collecting electrical energy from the stack body to the outside. The power collecting terminals are connected to a contactor (or a relay) for implementing the ON/OFF control for supplying electrical energy to an external load such as a motor.

For example, in a terminal device of a fuel cell disclosed in Japanese Laid-Open Utility Model Publication No. 61-7868, as shown in FIG. 10, unit cells 1 and bipolar plates 2 are stacked alternately, and half plates 2a are provided at opposite ends in the stacking direction. Terminal plates 3 are provided outside the half plates 2a, and insulating plates 4 are provided outside the terminal plates 3. Further, end plates 5 are provided outside the insulating plates 4.

An electrode pole (power collecting terminal) 6 is electrically connected to each of the terminal plates 3. The electrode pole 6 passes through the insulating plate 4 and the end plate 5 to the outside. The electrode pole 6 is inserted into an insulating sleeve 7, and fixed using a nut 8. A high voltage cable 9 is connected to the electrode pole 6. The cable 9 is connected to a contactor (not shown) or the like.

Due to the constraint with the layout, devices such as the contactor may be provided at one end of the fuel cell stack in the stacking direction. In this case, the cable 9 connected to the electrode pole 6 protruding outwardly from each end plate 5 needs to be drawn to the one side in the stacking direction.

For this purpose, the cable 9 connected to the electrode pole 6 at the other end in the stacking direction is curved at an angle of substantially 180°, and turns back toward the one end in the stacking direction. Thus, the cable 9 protrudes from the end surface of the end plate 5 by a relatively large distance H in the direction indicated by the arrow A.

Thus, a space required for placing the entire fuel cell stack becomes considerably large. Therefore, in particular, the fuel cell stack cannot be placed in a small space of a vehicle. Further, the layout cannot be designed freely.

SUMMARY OF THE INVENTION

A main object of the present invention is to provide a fuel cell system which makes it possible to suitably prevent protrusion of a cable to the outside of the fuel cell stack in a stacking direction, achieve reduction in the space required for providing the fuel cell stack, and design the layout including the fuel cell system freely.

The present invention relates to a fuel cell system including a fuel cell stack comprising a stack body formed by stacking a plurality of power generation cells in a stacking direction, end plates provided at opposite ends of the stack body in the stacking direction, and power collecting terminals protruding outwardly from the end plates. The power generation cell includes an electrolyte electrode assembly and a separator. The electrolyte electrode assembly includes a pair of electrodes and an electrolyte interposed between the electrodes.

The fuel cell system includes an electrically conductive member having one end electrically connected to one of the power collecting terminals such that the electrically conductive member extends along an end plate surface intersecting the power collecting terminal, and a cable electrically connected to the other end of the electrically conductive member, and extending toward the other of the power collecting terminals.

In the present invention, the electrically conductive member connected to the power collecting terminal extends along the end plate surface intersecting the power collecting terminal. Therefore, members such as a cable are not curved to protrude to the outside of the end plate in the stacking direction. In the structure, it is possible to suitably prevent significant protrusion of the components to the outside of the end plate in the stacking direction. Accordingly, the space required for providing the entire fuel cell system is reduced easily, and the layout including the fuel cell system can be designed freely.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
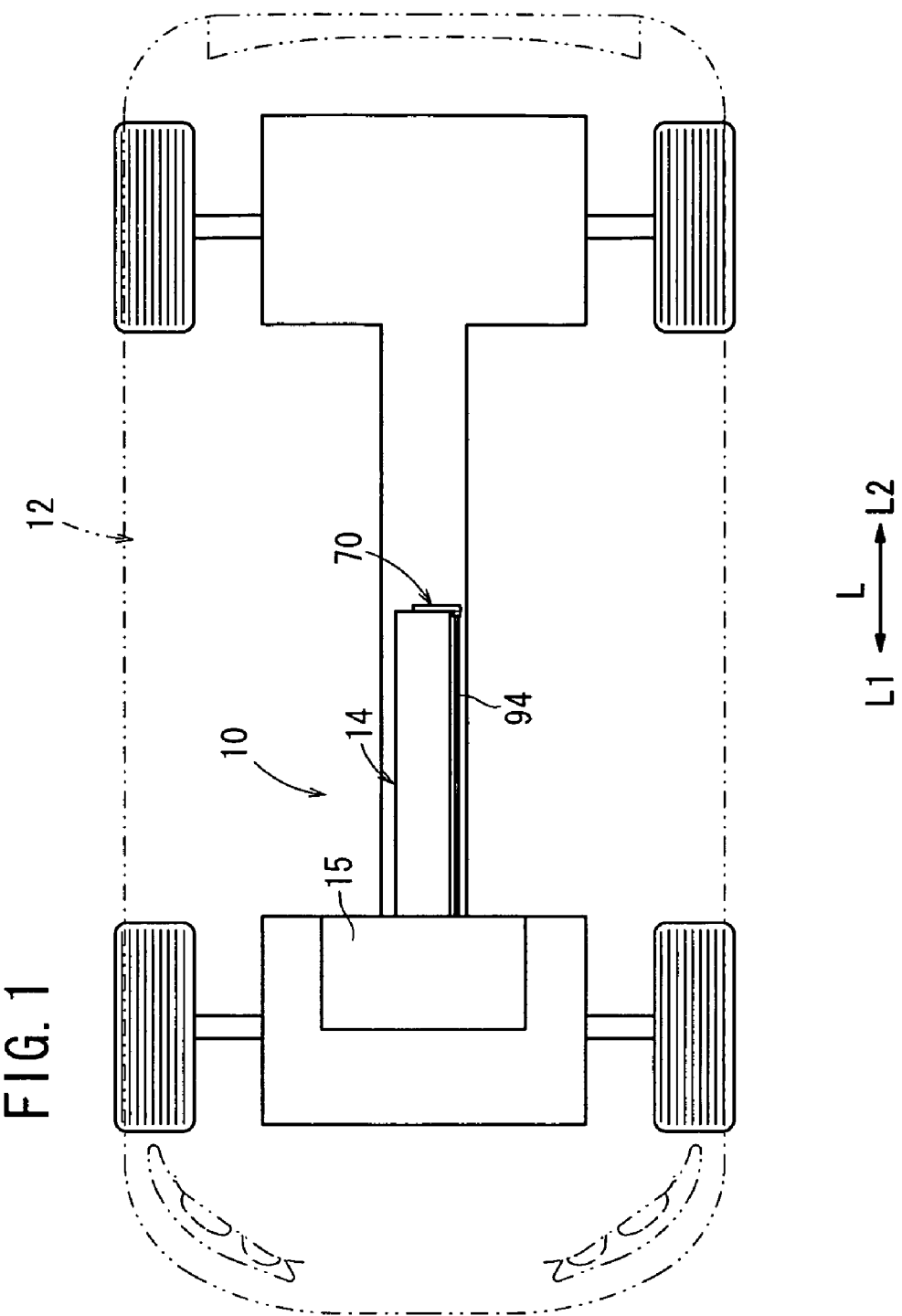
FIG. 1 is a partial plan view showing a vehicle equipped with a fuel cell system according to a first embodiment of the present invention.

FIG. 1 is a partial plan view showing a vehicle 12 equipped with a fuel cell system 10 according to a first embodiment of the present invention.

The fuel cell system 10 includes a fuel cell stack 14 provided at a substantially central position in a width direction of the vehicle 12 indicated by an arrow L. A device 15 including a contactor for implementing the ON/OFF control of the supply of electrical energy generated in the fuel cell stack 14 is provided ahead of the fuel cell stack 14 in a travel direction indicated by an arrow L1.

Figure 2:
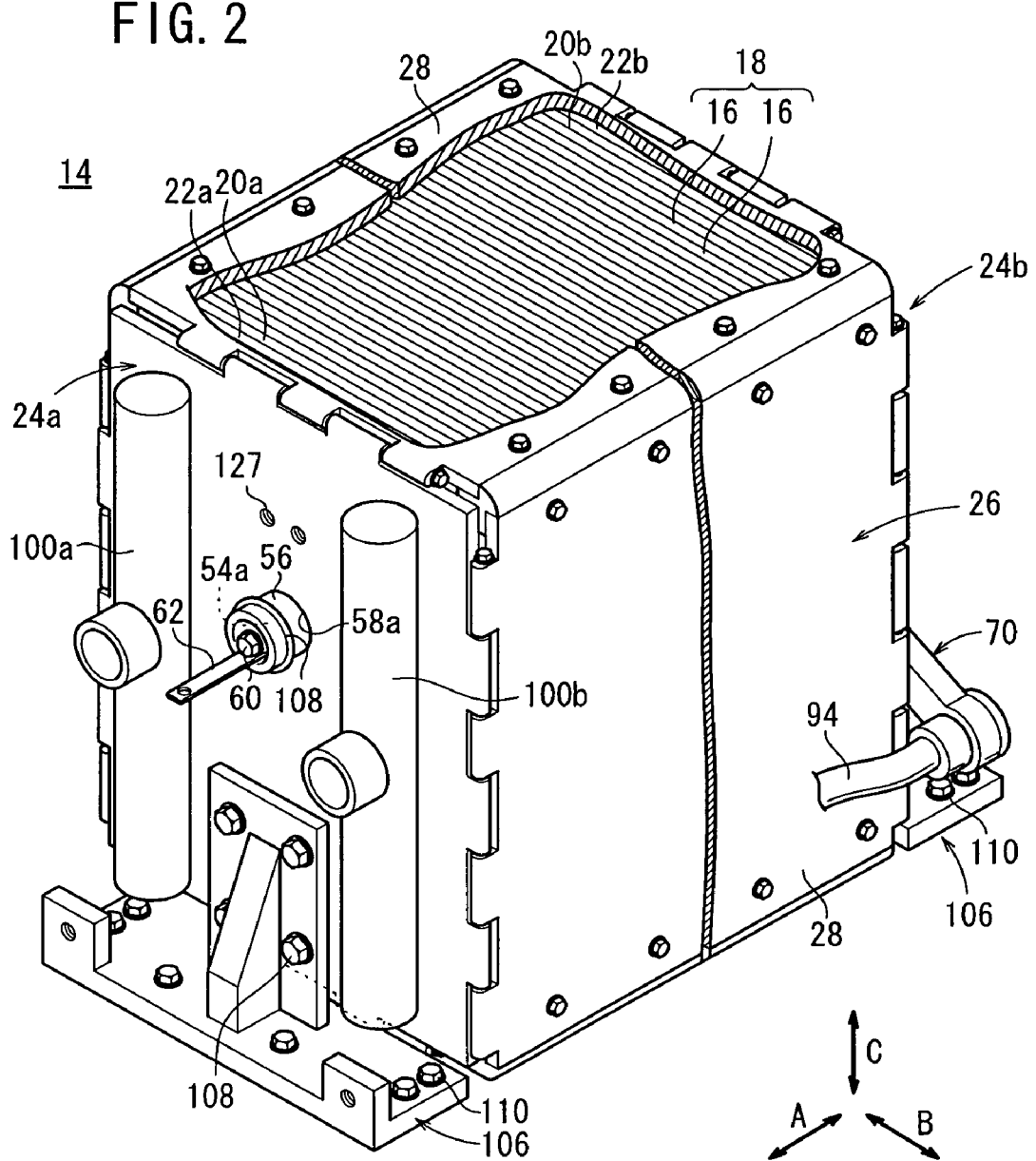
FIG. 2 is a perspective view schematically showing one end plate side of a fuel cell stack of the fuel cell system.

As shown in FIG. 2, the fuel cell stack 14 includes a stack body 18 formed by stacking a plurality of power generation cells 16 in a horizontal direction indicated by an arrow A. At one end of the stack body 18 in a stacking direction indicated by an arrow A, a terminal plate 20a is provided. An insulating plate 22a is provided outside the terminal plate 20a, and an end plate 24a is provided outside the insulating plate 22a. At the other end of stack body 18 in the stacking direction, a terminal plate 20b is provided. An insulating plate 22b is provided outside the terminal plate 20b, and an end plate 24b is provided outside the insulating plate 22b.

The fuel cell stack 14 is provided in a box-shaped casing 26 having the end plates 24a, 24b each having a rectangular shape. The end plates 24a, 24b are made of metal, and have long sides in a vertical direction indicted by an arrow C. The casing 26 has four side plates 28 fixed to the end plates 24a, 24b using hinge structure (see FIGS. 2 and 3).

Figure 4:
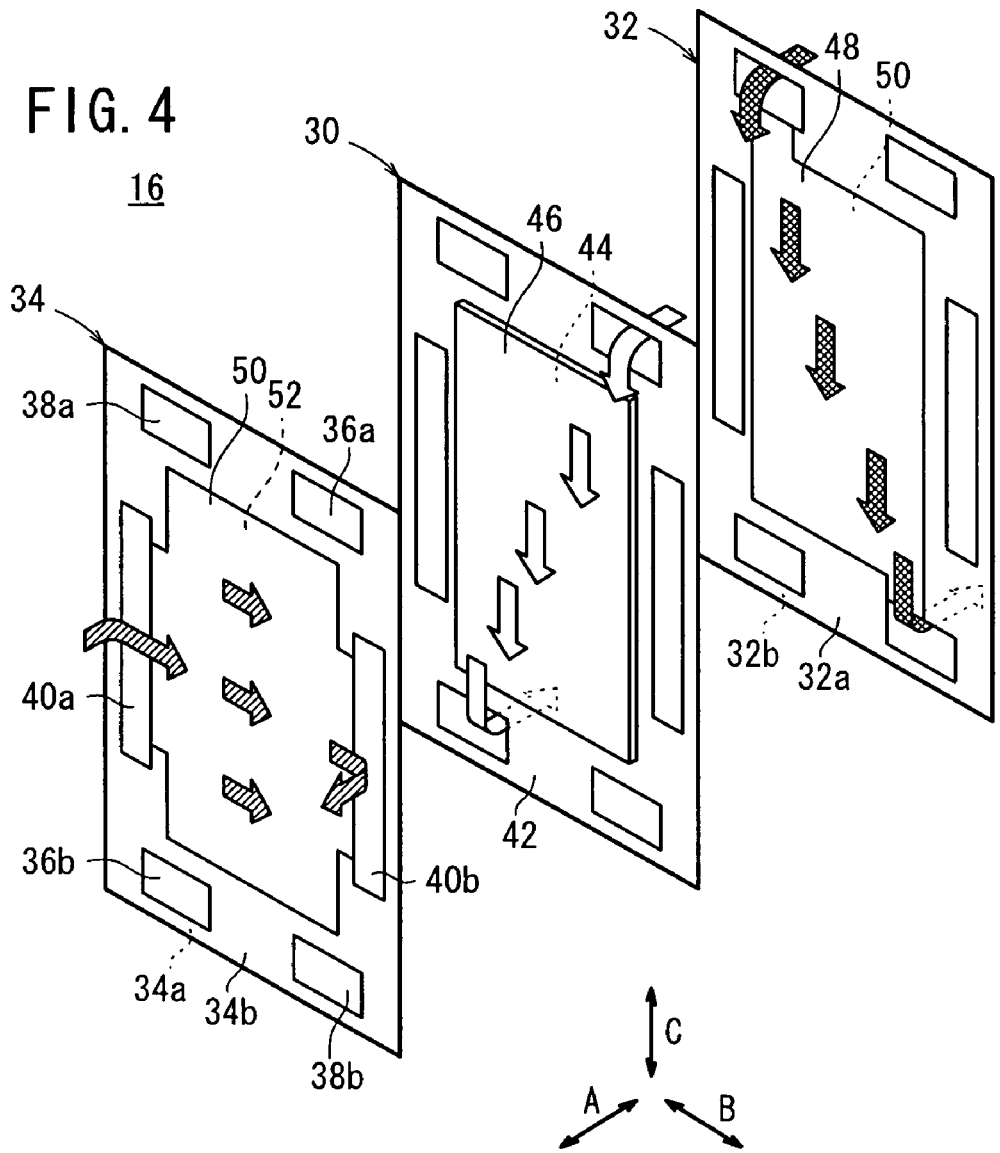
FIG. 4 is an exploded perspective view showing a power generation cell of the fuel cell stack.

As shown in FIG. 4, each of the power generation cells 16 includes a membrane electrode assembly (electrolyte electrode assembly) 30, its vertical length being greater than its horizontal length, and first and second metal separators 32, 34, its vertical length being greater than its horizontal length, and the first and second metal separators 32, 34 sandwich the membrane electrode assembly 30. The first and second metal separators 32, 34 are thin corrugated plates. Instead of the first and second metal separators 32, 34, for example, carbon separators may be used.

At one end of the power generation cell 16 in the direction indicated by the arrow C, an oxygen-containing gas supply passage 36a for supplying an oxygen-containing gas, and a fuel gas supply passage 38a for supplying a fuel gas such as a hydrogen-containing gas are provided. The oxygen-containing gas supply passage 36a and the fuel gas supply passage 38a extend through the power generation cell 16 in the direction indicated by the arrow A. At the other end of the power generation cell 16 in the direction indicated by the arrow C, a fuel gas discharge passage 38b for discharging the fuel gas, and an oxygen-containing gas discharge passage 36b for discharging the oxygen-containing gas are provided. The fuel gas discharge passage 38b and the oxygen-containing gas discharge passage 36b extend through the power generation cell 16 in the direction indicted by the arrow A.

At one end of the power generation cell 16 in the direction indicted by the arrow B, a coolant supply passage 40a for supplying a coolant is provided, and at the other end of the power generation cell 16 in the direction indicted by the arrow B, a coolant discharge passage 40b for discharging the coolant is provided. The coolant supply passage 40a and the coolant discharge passage 40b extend through the power generation cell 16 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

The first metal separator 32 has a fuel gas flow field 48 on its surface 32a facing the membrane electrode assembly 30. The fuel gas flow field 48 is connected between the fuel gas supply passage 38a and the fuel gas discharge passage 38b. For example, the fuel gas flow field 48 comprises a plurality of grooves extending in the direction indicated by the arrow C. A coolant flow field 50 is formed on a surface 32b of the first metal separator 32. The coolant flow field 50 is connected between the coolant supply passage 40a and the coolant discharge passage 40b. The coolant flow field 50 comprises grooves extending in the direction indicated by the arrow B.

The second metal separator 34 has an oxygen-containing gas flow field 52 on its surface 34a facing the membrane electrode assembly 30. The oxygen-containing gas flow field 52 is connected between the oxygen-containing gas supply passage 36a and the oxygen-containing gas discharge passage 36b. The oxygen-containing gas flow field 52 comprises grooves extending in the direction indicated by the arrow C. Grooves as part of the coolant flow field 50 are provided on a surface 34b of the second metal separator 34, and the surface 34b of the second metal separator 34 and the surface 32b of the first metal separator 32 are overlapped together to form the coolant flow field 50. Though not shown, seal members are formed integrally with the surfaces 32a, 32b of the first metal separator 32, and the surfaces 34a, 34b of the second metal separator 34.

As shown in FIG. 2, a first power collecting terminal 54a protrudes outwardly in the stacking direction, from a position spaced upwardly from the center in the surface of the terminal plate 20a by a predetermined distance. The first power collecting terminal 54a is inserted into an insulating cylindrical portion 56, and passes through the insulating plate 22a, and a hole 58a of the end plate 24a to the outside. A substantially L-shaped electrically conductive plate 62 is fixed to the first power collecting terminal 54a through a bolt 60.

Figure 3:
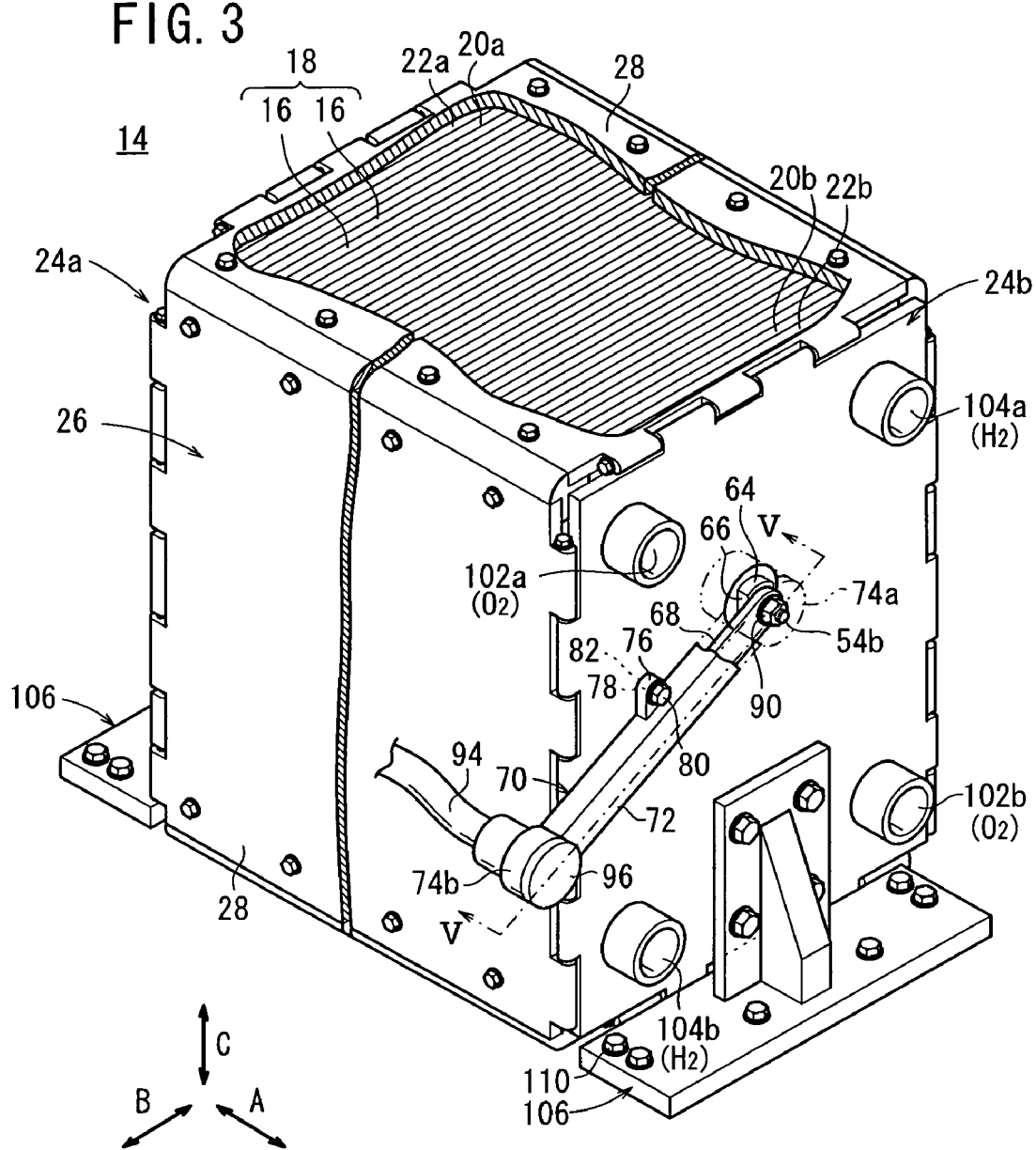
FIG. 3 is a perspective view schematically showing the other end plate side of the fuel cell stack of the fuel cell system.

As shown in FIG. 3, a second power collecting terminal 54b protrudes outwardly in the stacking direction, from a position upwardly away from the center in the surface of the terminal plate 20b by a predetermined distance.

Figure 5:
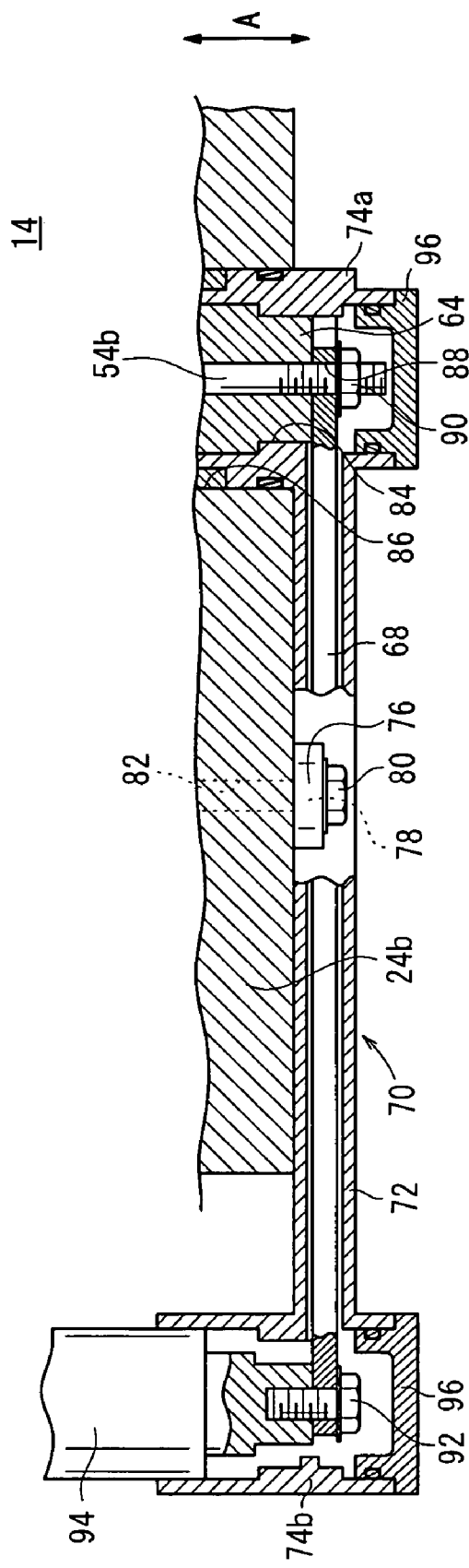
FIG. 5 is a cross sectional view showing the fuel cell stack, taken along a line V-V in FIG. 3.

As shown in FIGS. 3 and 5, a substantially cylindrical electrode member 64 is externally attached to the second power collecting terminal 54b. At a front end of the electrode member 64 having a small diameter, planar engagement surfaces 66 are formed by cutting opposite sides of the cylindrical outer surface. The second power collecting terminal 54b is electrically connected to one end of an electrically conductive member, e.g., a straight bus bar 68 such that the bus bar 68 extends along the end plate surface intersecting the second power collecting terminal 54b.

The bus bar 68 is placed in the casing 70. The casing 70 is made of electrically insulating material such as resin material. The casing 70 has an elongated rectangular body 72 containing the bus bar 68, and a first cylindrical connector 74a and a second cylindrical connector 74b provided at opposite ends of the rectangular body 72. The rectangular body 72 has an expansion 76 near the first cylindrical connector 74a, and a hole 78 is formed in the expansion 76. The bolt 80 inserted from the hole 78 is screwed into a screw hole 82 formed in the end plate 24b, and the rectangular body 72 is fixed to the end plate 24b.

The first cylindrical connector 74a has a hole 84 fitted to the electrode member 64. The hole 84 has a shape corresponding to the flat engagement surfaces 66 of the electrode member 64 to serve as a rotation prevention mechanism. As shown in FIG. 5, the first cylindrical connector 74a is inserted into the hole 86 of the end plate 24a, and the second power collecting terminal 54b passes through the hole 88 of the bus bar 68, and the front end of the second power current collecting terminal 54b is screwed into a nut 90.

The other end of the bus bar 68 is fixed to a high voltage cable 94 through a bolt 92 in the second cylindrical connector 74b. The second cylindrical connector 74b is provided below the end plate 24b (see FIG. 3). The high voltage cable 94 connected to the second cylindrical connector 74b extends toward the end plate 24a along a side of the fuel cell stack 14, and the high voltage cable 94 is electrically connected to the device 15. As shown in FIG. 5, insulating caps 96 are attached to ends of openings of the first cylindrical connector 74a and the second cylindrical connector 74b.

As shown in FIG. 2, a coolant inlet manifold 100a and a coolant outlet manifold 100b extending in the direction indicated by the arrow C are attached to the end plate 24a. The coolant inlet manifold 100a is connected to the coolant supply passage 40a, and the coolant outlet manifold 100b is connected to the coolant discharge passage 40b. Though not shown, the coolant inlet manifold 100a and the coolant outlet manifold 100b are connected to a radiator (heat exchanger) provided on a front side of the vehicle.

As shown in FIG. 3, an oxygen-containing gas inlet manifold 102a and a fuel gas inlet manifold 104a are provided at upper positions of the end plate 24b. The oxygen-containing gas inlet manifold 102a is connected to the oxygen-containing gas supply passage 36a and the fuel gas inlet manifold 104a is connected to the fuel gas supply passage 38a. An oxygen-containing gas outlet manifold 102b and a fuel gas outlet manifold 104b are provided at lower positions of the end plate 24b. The oxygen-containing gas outlet manifold 102b is connected to the oxygen-containing discharge passage 36b, and the fuel gas outlet manifold 104b is connected to the fuel gas discharge passage 38b.

As shown in FIGS. 2 and 3, mounting brackets 106 are fixed to the end plates 24a, 24b at lower positions using bolts 108. Further, the mounting brackets 106 are connected to the vehicle 12 using bolts 110.

Operation of the fuel cell system 10 will be described.

Firstly, as shown in FIG. 3, in the fuel cell stack 14, an oxygen-containing gas is supplied from the oxygen-containing gas inlet manifold 102a of the end plate 24b to the oxygen-containing gas supply passage 36a, and a fuel gas such as a hydrogen-containing gas is supplied from the fuel gas inlet manifold 104a to the fuel gas supply passage 38a. Further, a coolant such as pure water or ethylene glycol is supplied from the coolant inlet manifold 100a of the end plate 24a to the coolant supply passage 40a.

Thus, in the stack body 18, the oxygen-containing gas, the fuel gas, and the coolant are supplied in the direction indicated by the arrow A, to the power generation cells 16 stacked together in the direction indicated by the arrow A. As shown in FIG. 4, the oxygen-containing gas flows from the oxygen-containing gas supply passage 36a to the oxygen-containing gas flow field 52 of the second metal separator 34, and flows along the cathode 46 of the membrane electrode assembly 30 for inducing an electrochemical reaction at the cathode 46. The fuel gas flows from the fuel gas supply passage 38a to the fuel gas flow field 48 of the first metal separator 32, and flows along the anode 44 of the membrane electrode assembly 30 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen-containing gas is supplied to and consumed at the cathode 46, the oxygen-containing gas flows along the oxygen-containing gas discharge passage 36b, and the oxygen-containing gas is discharged to the outside from the oxygen-containing gas outlet manifold 102b of the end plate 24b (see FIG. 3). Likewise, after the fuel gas is supplied to and consumed at the anode 44, the fuel gas flows along the fuel gas discharge passage 38b, and the fuel gas is discharged to the outside from the fuel gas outlet manifold 104b of the end plate 24b.

The coolant flows into the coolant flow field 50 between the first and second metal separators 32, 34, and flows in the direction indicated by the arrow B. After the coolant cools the membrane electrode assembly 30, the coolant flows along the coolant discharge passage 40b, and the coolant is discharged to the outside from the coolant outlet manifold 100b of the end plate 24a.

In the first embodiment, as shown in FIG. 5, one end of the bus bar 68 is electrically connected to the second power collecting terminal 54b. The bus bar 68 is oriented at an angle of substantially 90° with respect to the second power outputting terminal 54b, and extends along the surface of the end plate 24b. The high voltage cable 94 is connected to the other end of the bus bar 68.

For example, in comparison with the structure in which the high voltage cable 94 is directly connected to the second power collecting terminal 54b, and the high voltage cable 94 is drawn toward the end plate 24a, it is possible to reduce the size of protrusion to the outside from the end plate 24b in the stacking direction. It is because, when the high voltage cable 94 is directly connected to the second power collecting terminal 54b, the high voltage cable 94 which turns back from the end plate 24b side to the end plate 24a side needs to have a curve with a large radius of curvature R.

Thus, using the bus bar 68, it is possible to prevent excessive protrusion of components such as the high voltage cable 94 to the outside from the end surface of the end plate 24b in the stacking direction. Accordingly, the space required for providing the entire fuel cell stack 14 is reduced in the stacking direction. Further, the entire fuel cell system 10 can be placed suitably in a small space of the vehicle 12, and the layout including the fuel cell system 10 can be designed freely.

Further, in the casing 70 containing the bus bar 68, the rotation prevention mechanism having the flat engagement surfaces 66 are provided for the hole 84 of the first cylindrical connector 74a and the electrode member 64 (see FIGS. 3 and 5). Thus, at the time of attaching the bus bar 68 to the second power collecting terminal 54b, or connecting the high voltage cable 94 to the bas bar 68, it is possible to reliably prevent unwanted rotation of the bus bar 68.

Further, by rotation prevention mechanism, the angle of attachment between the second power collecting terminal 54b and the bus bar 68 relative to each other is determined easily and reliably. Thus, it is possible to provide the second cylindrical connector 74b at a lower position of the end plate 24b, and the high voltage cable 94 can be drawn toward the end plate 24a along a side of the fuel cell stack 14 at a lower position.

Further, the casing 70 is easily and reliably attached to the end plate 24b by inserting the bolt 80 through the hole 78 into the screw hole 82 of the end plate 24b.

In the first embodiment, though the bus bar 68 is used as the electrically conductive member, the present invention is not limited in this respect. For example, one end of a cable (not shown) extending in a direction perpendicular to the second power collecting terminal 54b may be fixed to the second power collecting terminal 54b using a connector.

Figure 6:
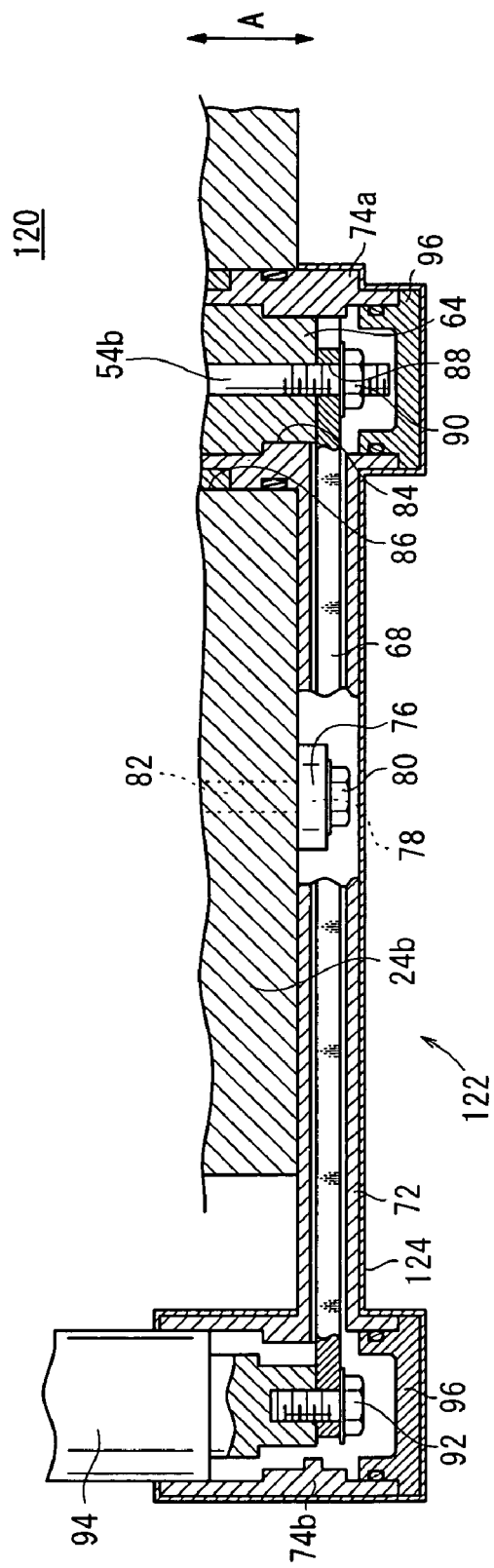
FIG. 6 is a partial cross sectional view showing a fuel cell stack of a fuel cell system according to a second embodiment of the present invention.

FIG. 6 is a partial cross sectional view showing a fuel cell stack 120 of a fuel cell system according to a second embodiment of the present invention. The constituent elements that are identical to those of the fuel cell stack 14 of the fuel cell system 10 according to the first embodiment are labeled with the same reference numerals, and description there of will be omitted. Further, in third and fourth embodiments as described later, the constituent elements that are identical to those of the fuel cell stack 14 of the fuel cell system 10 according to the first embodiment are labeled with the same reference numerals, and description there of will be omitted.

The fuel cell stack 120 has a casing 122 containing the bus bar 68. For example, the casing 122 is made of electrically insulating material such as resin material. A metal layer (layer made of electrically conductive material) 124 is formed e.g., by metal coating. As the metal coating, for example, vacuum deposition, painting, or plating may be used. For example, the metal layer 124 comprises a metal foil having a thickness of about 10 μm.

As the metal material, copper, iron, nickel or the like is used. As the non-metal material, electrically conductive material having a shielding function such as an electrically conductive ceramics or electrically conductive glass may be used.

In the second embodiment, since the metal layer 124 is formed on the surface of the casing 122 which is made of resin material, and contains the bus bar 68, shielding of electromagnetic waves is performed reliably. This embodiment can be implemented simply by providing the metal layer 124 on the surface of the casing 122. The overall weight of the fuel cell stack 120 is reduced, and the fuel cell stack 120 can be provided in a small space.

Figure 7:
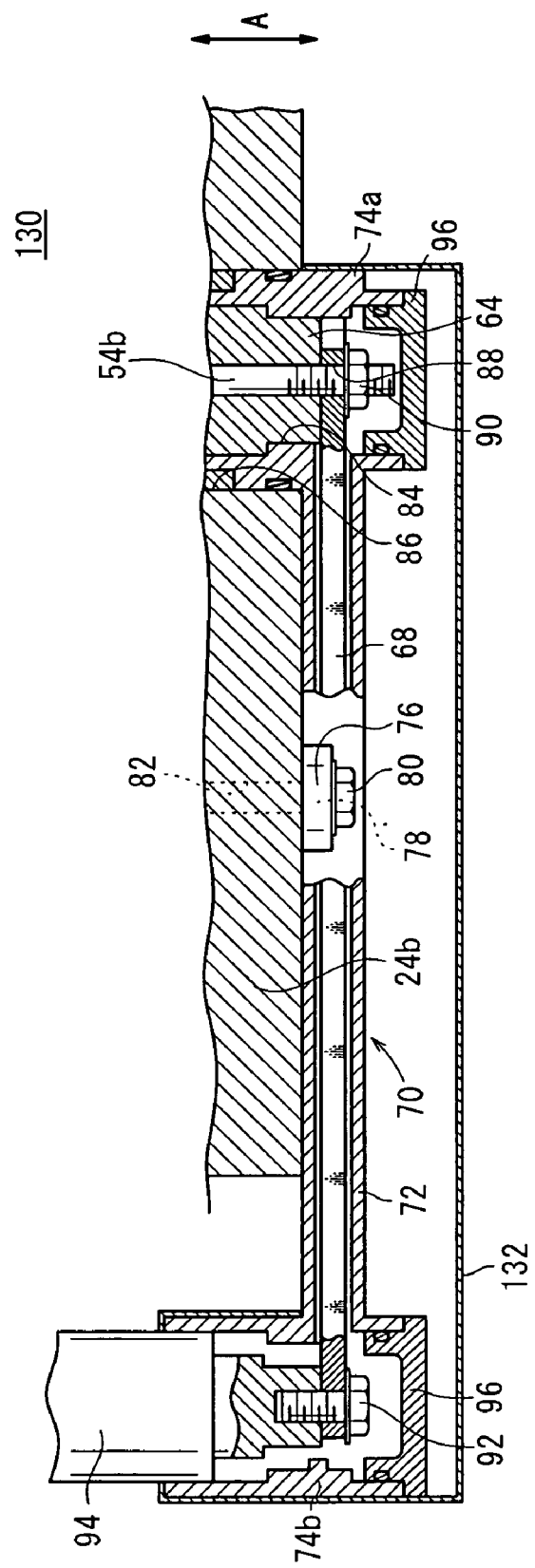
FIG. 7 is a partial cross sectional view showing a fuel cell stack of a fuel cell system according to a third embodiment of the present invention.

FIG. 7 is a partial cross sectional view showing a fuel cell stack 130 of a fuel cell system according to a third embodiment of the present invention.

The fuel cell stack 130 includes a metal cover (layer of electrically conductive material) 132 around a casing 70 containing the bus bar 68. For example, the metal cover 132 is a thin metal plate.

In the third embodiment, as in the case of the second embodiment, improvement in shielding of electromagnetic waves is achieved. Further, the overall weight of the fuel cell stack 130 is reduced, and the fuel cell stack 130 can be provided in a small space.

Figure 8:
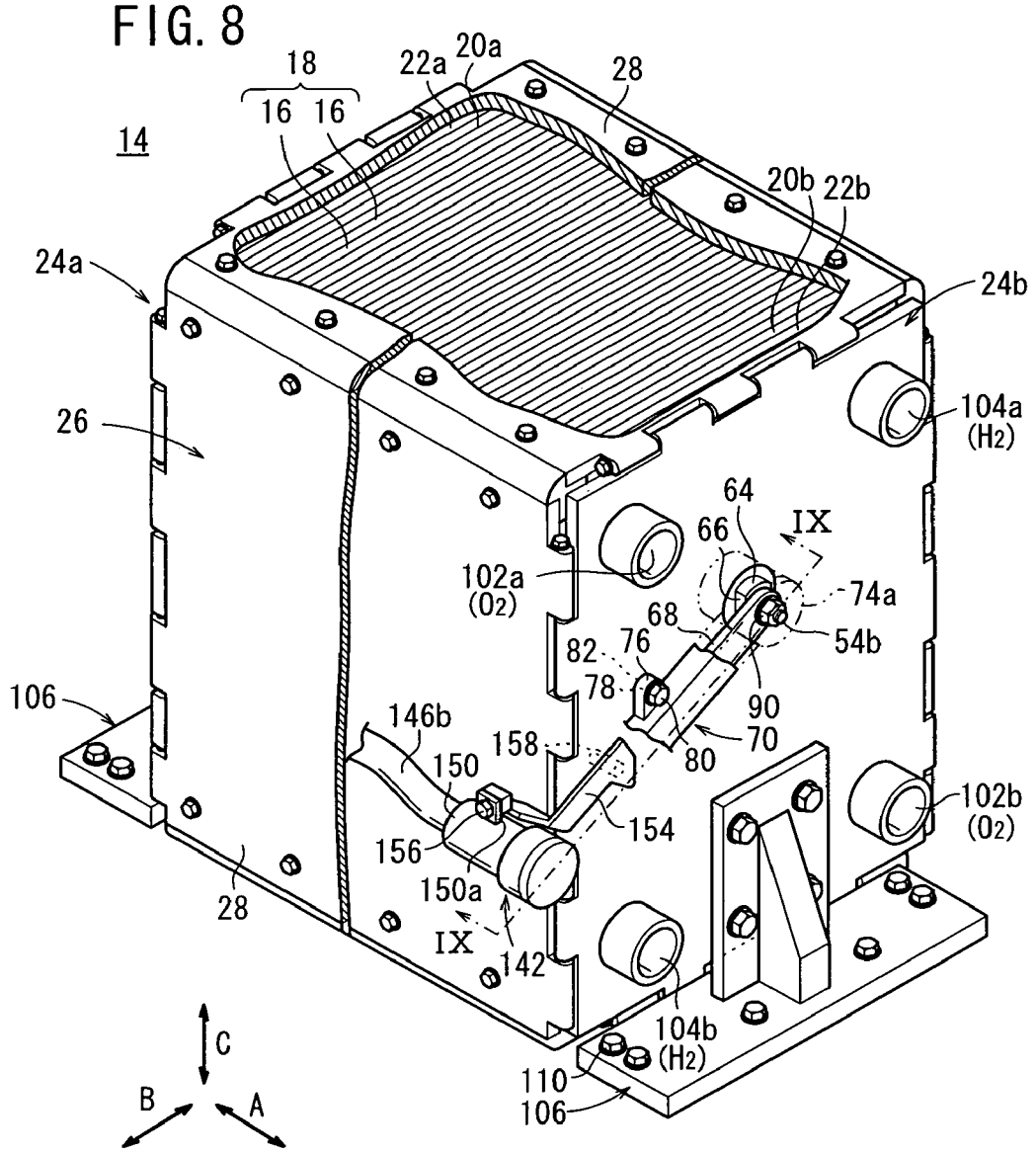
FIG. 8 is a perspective view schematically showing a fuel cell stack of a fuel cell system according to a fourth embodiment of the present invention.

FIG. 8 is a perspective view schematically showing a fuel cell stack 140 according to a fourth embodiment of the present invention.

Figure 9:
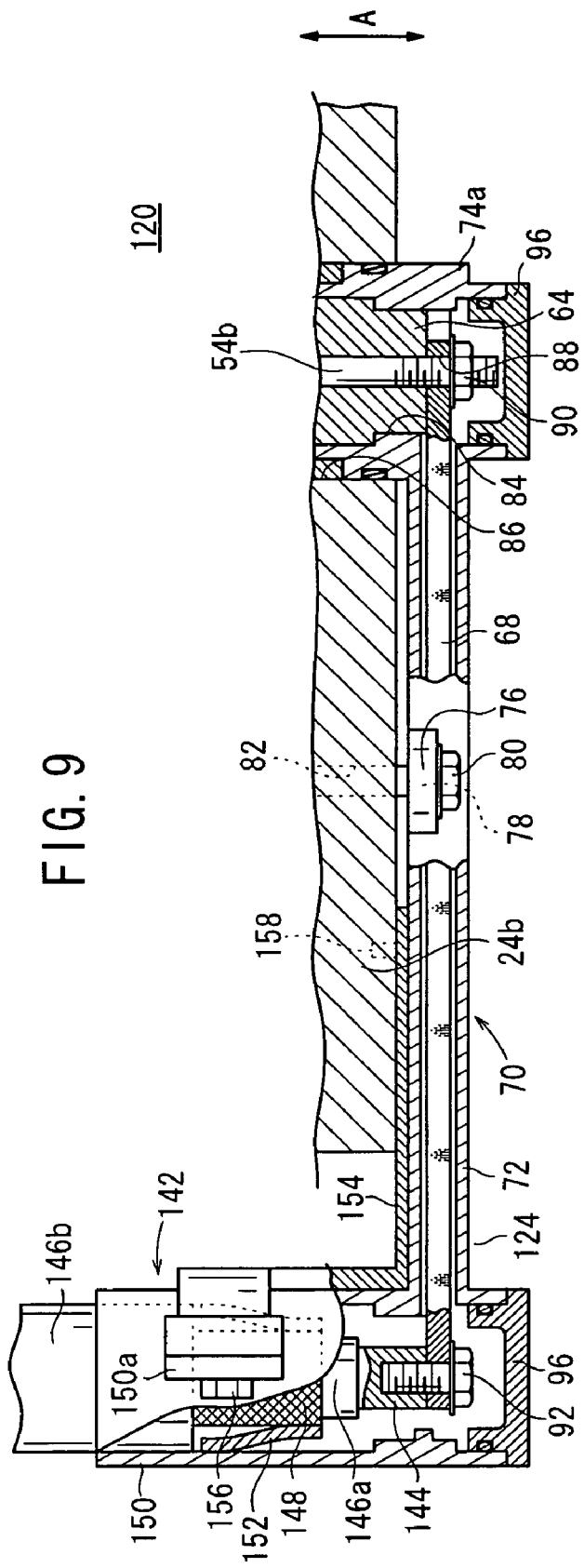
FIG. 9 is a cross sectional view showing a high voltage cable.
Figure 10:
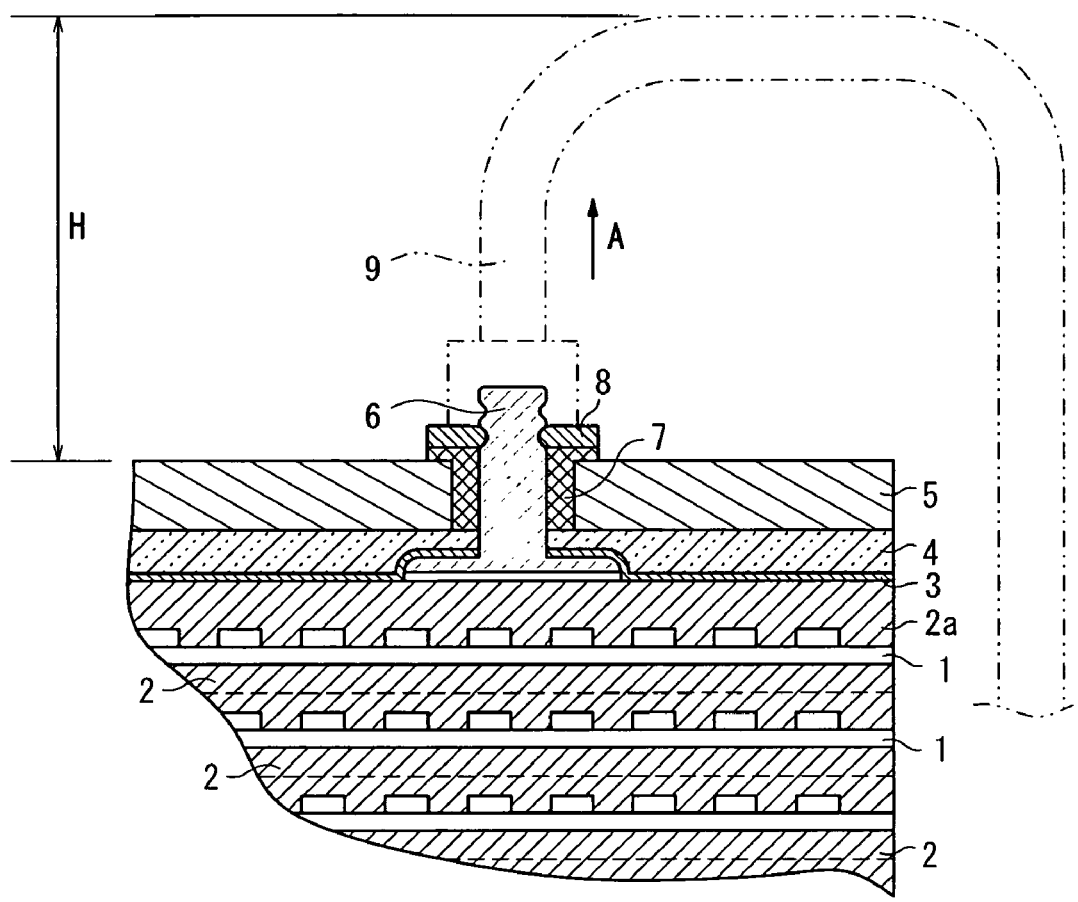
FIG. 10 is a cross sectional view showing a conventional terminal device.

As shown in FIG. 9, a high voltage cable 142 of the fuel cell stack 140 has a shielded wire 148 around a core 144 through an insulating coating 146a. A metal cylindrical body 150 is provided around the shielded wire 148 through insulating coating 146b. The shielded wire 148 and the metal cylindrical body 150 are electrically connected through a metal spring 152.

A mounting plate 150a is attached to an outer circumferential region of the metal cylindrical body 150, and one end of an electrically conductive bracket 154 is fixed to the mounting plate 150a through a fixing member 156. A connection pin member 158 is provided at the other end of the electrically conductive bracket 154, and the connection pin member 158 is connected to the end plate 24b for connecting the electrically conductive bracket 154 to the ground. It should be noted that bolt tightening may be adopted instead of using the connection pin member 158.

In the fourth embodiment, the shielded wire 148 around the core 144 of the high voltage cable 142 is grounded from the electrically conductive bracket 154 through the end plate 24b. In the structure, it is not necessary to pull out a ground wire from the high voltage cable 142. The shielding structure of the high voltage cable 142 is simplified effectively. Further, the overall weight of the fuel cell stack 140 is reduced, and the fuel cell stack 140 can be provided in a small space.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system including a fuel cell stack comprising a stack body formed by stacking a plurality of power generation cells in a stacking direction, end plates provided at opposite ends of said stack body in the stacking direction, and power collecting terminals protruding outwardly from said end plates, each of said power generation cells including an electrolyte electrode assembly and a separator, said electrolyte electrode assembly including a pair of electrodes and an electrolyte interposed between said electrodes, said fuel cell system comprising:
a plate shaped straight bus bar provided inside a casing made of electrically insulating material having one end electrically connected to one of said power collecting terminals such that said straight bus bar extends only along an end plate surface intersecting said one of said power collecting terminals; and
a cable electrically connected to another end of said bus bar, and extending toward another of said power collecting terminals,
wherein said casing includes:
a rotation prevention mechanism having:
a substantially cylindrical electrode member coupled to the power collecting terminal, wherein a portion of a cylindrical outer surface of the electrode member is cut to create a flat surface portion, and
a cylindrical connector coupled to the end plate, wherein the flat surface portion of the electrode member fits into a hole of the cylindrical connector to prevent rotation of the bus bar relative to said end plate, the hole having a shape corresponding to the flat surface portion of the electrode member.

2. A fuel cell system according to claim 1, wherein a layer of electrically conductive material is provided around at least a part of an outer surface of said casing.

3. A fuel cell system according to claim 2, wherein said layer of electrically conductive material is a metal layer formed on the outer surface of said casing.

4. A fuel cell system according to claim 2, wherein said electrically conductive layer comprises a metal cover surrounding said casing.

5. A fuel cell system according to claim 1, further comprising an electrically conductive bracket connected to a shielded wire provided for said cable, wherein said electrically conductive bracket is connected to the ground through said end plate.

6. A fuel cell system according to claim 1, wherein said fuel cell stack is mounted in a vehicle, and a device electrically connected to said power collecting terminal is provided ahead of said fuel cell stack in a travel direction of said vehicle.

* * * * *